United States Patent Office 3,539,901
Patented Nov. 10, 1970

3,539,901
RECTIFIER FREQUENCY CONVERTER
George M. Rosenberry, Jr., Elnora, N.Y., and Dennis F. Williamson, Peterborough, Ontario, Canada, assignors to Canadian General Electric Company, Limited, Toronto, Ontario, Canada, a corporation of Canada
Filed June 2, 1969, Ser. No. 829,478
Int. Cl. H02m 5/14, 5/16, 5/30
U.S. Cl. 321—7                              4 Claims

ABSTRACT OF THE DISCLOSURE

Cycloconverter comprising a firing circuit and a delta configuration of three full-wave bridges in which each has three parallel legs with at least two thyristors per leg connected in series anode to cathode. Three Y connected secondaries of a three-phase transformer provide a standard frequency input to the bridges. An adjustable frequency output is taken from the corners of the delta. Each transformer secondary is connected to a different bridge to three legs respectively thereof between the thyristors. According to this invention the circulating currents in the delta bridge configuration is reduced by displacing the voltage of the three Y secondaries.

BACKGROUND OF THE INVENTION

Frequency converters using controlled rectifiers, in particular thyristors, are well known for multi-phase alternating current applications where an adjustable frequency is wanted. This type of converter is now being used for controlling the speed of induction or synchronous motors by changing the frequency of the alternating current supplied to the motor. A wide range of speed control is usually wanted in both forward and reverse rotation of the motor as well as electrodynamic braking in both rotations. These requirements have led to complicated circuits using a large number of controlled rectifiers.

Simplified circuits have been developed. One of the simplest is a delta configuration of three full-wave bridges in which each bridge has three parallel legs with at least two controlled rectifiers per leg connected in series anode to cathode. Three Y connected secondaries of a three-phase transformer provide a standard frequency input to the bridges. Each transformer secondary is connected to a different bridge to the three legs respectively thereof between the controlled rectifiers. An adjustable frequency output is taken from between the bridges at the corners of the delta. Firing of the rectifiers is controlled so that conduction of the rectifiers produces an output frequency that can be adjusted within certain limits. A major drawback of this circuit is that some of the lower frequency odd harmonics, which are usually present, may cause unwanted currents to circulate in the circuit. To decrease these circulating currents to acceptable levels, reactors have been placed in the delta configuration of bridges. The use of reactors for minimizing circulating currents is disclosed in Canadian patent No. 716,223, issued Aug. 17, 1965, Royston A. Hammond. Another related disclosure is U.S. Patent 3,274,482 issued Sept. 20, 1966, Manfred Depenbrock.

SUMMARY OF THE INVENTION

According to this invention, we propose reducing the circulating currents in the delta bridge configuration described in the foregoing paragraph by phase displacing the voltages of the source by an angle of 20°. Two ways of doing this will now be described with reference to the accompanying drawings.

DESCRIPTION OF THE PREFERRED EMBODIMENT

Figure 1:
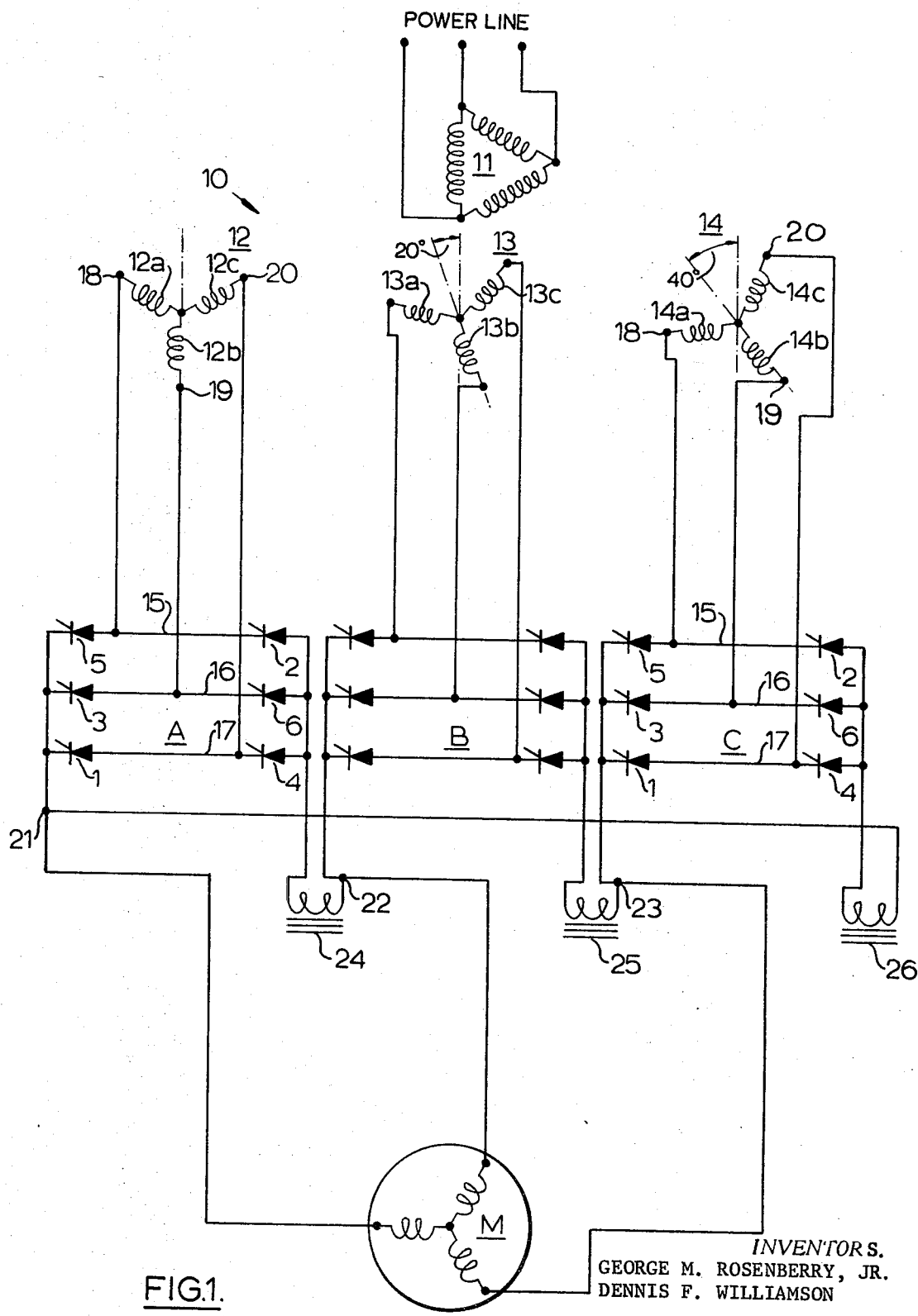
FIG. 1 is a circuit diagram of a rectifier frequency converter for changing the frequency of commercial three-phase power.

In FIG. 1 there is shown a three-phase transformer 10 having a delta connected primary 11 energized from a from a source of standard frequency alternating current, i.e., a 60 cycle power supply, and three Y connected secondaries 12, 13 and 14 connected to a delta configuration of rectifier bridges A, B and C. Bridges A, B and C are alike; each one is a conventional full-wave bridge for use in a three-phase circuit. Each bridge has three parallel legs 15, 16 and 17 with two controlled rectifiers per leg connected in series anode to cathode, preferably thyristors. The six thyristors are numbered in their firing order, numbers 5 and 2 being in leg 15, 3 and 6 in leg 16, and 1 and 4 in leg 17. Each transformer secondary has its output terminals 18, 19 and 20 connected to the three legs 15, 16 and 17 respectively of a different bridge between the two thyristors in the leg.

The points 21, 22 and 23 joining bridges A, B and C in a delta formation, i.e., the corners of the delta, constitute the output terminals of the circuit described in the foregoing paragraph. These terminals are connected to a three-phase load M which may be the primary winding of an induction of synchronous motor. The output from terminals 21, 22 and 23 is a three-phase output having a frequency which can be adjusted by the firing of the thyristors. When the load is a motor of which the speed is governed by the frequency, as the load usually is, the frequency will be made adjustable over a wide range. In those cases where the speed of the motor must be controlled for both directions of rotation, the frequency may range from zero to well above the standard 60 cycles for both forward and reverse motor rotations. Because reversible operation usually calls for electrodynamic braking by the motor, it is desirable that the converter be capable of feeding the electrical energy generated by the motor back into the power line. Since the firing controls necessary for this kind of motor operation form on particular part of the invention, they will be mentioned very briefly.

The converter circuit described so far is known, as is the use of reactors such as 24, 25 and 26 in the delta configuration of rectifier bridges A, B and C. These reactors serve to decrease the currents of harmonic origin that circulate in the delta circuit. In some applications a capacitor of the proper value is connected across each one of the reactors 24, 25 and 26. This may decrease the circulating currents even further when the reactor-capacitor circuit is tuned to the sixth harmonic of the input frequency.

According to our invention the circulating currents of harmonic origin frequently present in the delta configuration of rectifier bridges can be held to an acceptable low level in another way, without the use of reactors or in combination therewith in certain instances. We do this by displacing the voltages applied to the rectifier bridges. Referring again to FIG. 1, the voltages of transformer secondaries 13 and 14 are displaced twenty and forty electrical degrees respectively in the same phase sense from the voltage of secondary 12. This is illustrated by the twenty degrees counter-clockwise rotation of secondary 13 with respect to secondary 12, and the forty degrees counter-clockwise rotation of secondary 14 with respect to secondary 12. This means that the voltage of secondary 13 is displaced 20° in phase from the voltage of secondary 12, and that the voltage of secondary 14 is displaced a further 20° in the same phase sense. Hence the voltages applied to bridges A, B and C are a progression of three-phase voltages twenty electrical degrees out of step. It makes no difference whether the phase shift is counter-clockwise or clockwise so long as the three-phase voltages are progressively 20° out of step. That is, the relationship shown for secondaries 12, 13 and 14 in FIG. 1 may also be in clockwise order, or secondary 12 may be displaced 20° counter-clockwise and secondary 14 displaced 20° clockwise with respect to secondary 13, or vice versa. The means employed for displacing the voltages of the three secondaries is well known in the transformer art and requires no further comment.

A means for firing the controlled rectifiers in the bridges so as to obtain an adjustable frequency alternating current output from the configuration of bridges consists essentially of a combination of circuits which in their quiescent state produce a series of pulses of sufficient energy to render the controlled rectifiers conductive, i.e., fire the thyristors 1 to 6 shown in the drawings. The pulses fire each thyristor at a phase delay angle of 90° from the free conduction point of the applied voltage waveform. It is known that a firing delay of 90° produces a net output from the three-phase rectifier bridge of zero DC volts and a sixth harmonic of the input frequency, which harmonic results in a 360 pulse undirectional current flow in the circuit. If the firing delay is modulated about the 90° point, a modulated output of about zero voltage will occur. Full modulation consists of periodically advancing the firing delay to 0° and retarding it to 180°. The output frequency will be seen to be dependent on the periodicity of the modulation. Partial modulation, such as advancing the firing to 60° and retarding to 120° produces a reduced voltage output. The gate pulses are related to the anode-to-cathode voltage of the power thyristors, and limits are placed at the 0° and the 180° retard positions. Furthermore, an adjustable stop is provided around 150° retard to prevent inverter shoot-through.

If the voltages that secondaries 12, 13 and 14 apply to bridges A, B and C are too high for the individual thyristors 1 to 6, each may be replaced by two or more in series as required for the particular voltage. This is well known in the art.

Figure 2:
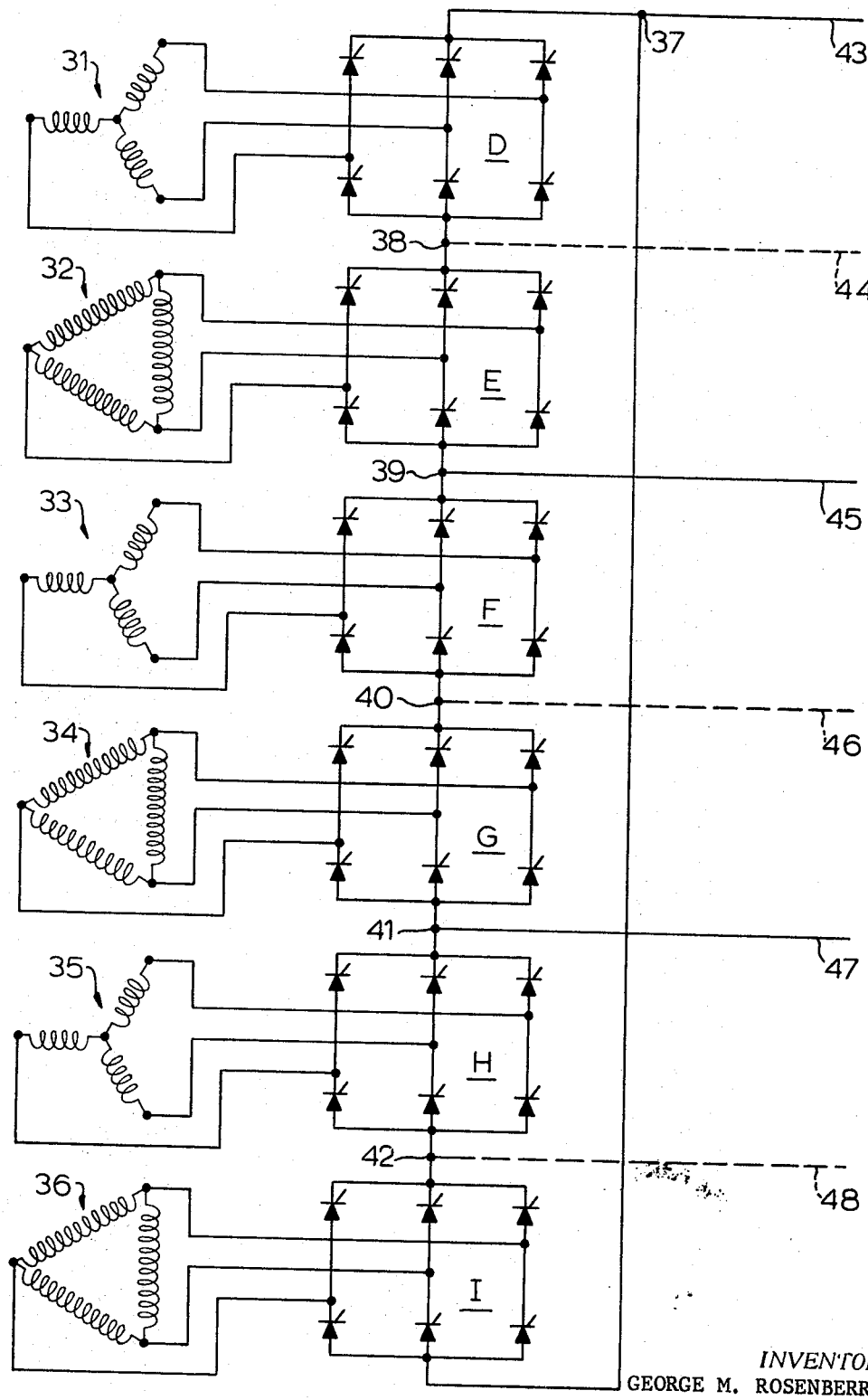
FIG. 2 is a circuit diagram of another rectifier frequency converter.

According to our invention displacement of the voltages applied to the bridge rectifiers may be achieved in another way, which will now be described in connection with FIG. 2. In this figure there is shown six three-phase transformer secondaries 31 to 36 which may be wound on a multi-legged core of a transformer having a three-phase primary winding or be secondaries of two or more transformers. Secondaries 31 to 36 are connected alternately Y and delta in such a way that the voltages of the three Y connected secondaries are in phase and the voltages of the three delta connected secondaries are also in phase, but that the voltage of the Y connected secondaries is displaced thirty electrical degrees with respect to the voltage of the delta connected secondaries. Six full-wave, three-phase bridges D to I of six thyristors each are interconnected at points 37 to 42 in a closed loop formation. Bridges D to I are all alike and also like the bridges A, B and C shown in FIG. 1. Secondary windings 31 to 36 are connected to bridges D to I respectively, in each case the three output terminals of the secondary being connected to the three legs respectively of the bridge between the two thyristors in the leg. An adjustable frequency output is obtained at points 37 to 42 by way of the leads 43 to 48 respectively coming from these points. This output is either three-phase or six-phase, and its frequency is made adjustable over a wide range as with the FIG. 1 circuit through the sequence and time of firing the thyristors in the six bridges. Three-phase power is obtained from leads 43, 45 and 47 or leads 44, 46 and 48, and six-phase power is obtained from leads 43 to 48.

In adjustable speed drives where large motors are required, the frequency converter shown in FIG. 3 may offer some practical advantages over the circuit of FIG. 1 because six-phase power is now available for driving the motor. Six-phase power results in improved flux distribution and torque for the motor. This circuit has twice as many transformer secondaries and thyristors as the circuit in FIG. 1. However, once the load becomes very large, a doubling of the number of transformer secondaries and thyristors may become more economical even in the FIG. 1 circuit.

What is claimed is:

1. A frequency converter comprising a plurality of multi-phase alternating current sources, each being displaced in phase and of constant frequency, an equal plurality of full-wave rectifier bridge circuits, each having three parallel legs in each of which two controlled rectifiers are in series, three conductors for each source connecting a different one of said sources to a different one of said bridge circuits, the three conductors for each source being connected to the three legs respectively of the bridge circuit between said rectifiers, the said bridge circuits being connected in a balanced delta configuration, a multi-phase load connected to said delta configuration, and control circuits for actuating said controlled rectifiers to conduct to change the frequency of the said sources delivered to the said load in accordance with said control circuits.

2. The invention as set forth in claim 1 wherein the said sources comprise a three-phase source with the voltages of succeeding phases displaced 20 degrees apart.

3. The invention according to claim 1 with the further provision of six three-phase alternating current sources having the voltages of the even numbered phases displaced 30 degrees from the odd numbered phases.

4. The invention according to claim 2 wherein said sources are three Y connected secondaries of a three-phase transformer having a delta connected primary and a common core, said secondaries being wound on the core to produce said displacements.

References Cited
UNITED STATES PATENTS 3,274,482 9/1966 Depenbrack ......... 321—69
3,445,747 5/1969 Laurent ............ 321—8 X
3,448,286 6/1969 Stackegard.

WILLIAM H. BEHA, Jr., Primary Examiner

U.S. Cl. X.R.

321—9, 66, 69